J. W. ELLS.
Animal Trap.

No. 88,778.      Patented Apr. 13, 1869.

Witnesses:
J. B. Whaley

Inventor:
Josiah W. Ells

JOSIAH W. ELLS, OF PITTSBURG, PENNSYLVANIA.

Letters Patent No. 88,778, dated April 13, 1869.

IMPROVED ANIMAL TRAP.

The Schedule referred to in these Letters Patent and making part of the same.

*To all whom it may concern:*

Be it known that I, JOSIAH W. ELLS, of Pittsburg, in the county of Allegheny, and State of Pennsylvania, have invented a new and improved Animal Trap; and I hereby declare that the following is a full, clear, and exact description of my invention, reference being had to the accompanying drawings, forming part of this specification, and to the letters of reference marked thereon, in which—

All the drawings are lettered, and similar letters denote like parts in the several views.

The nature of my invention consists in constructing a trap for catching animals, so that the outside or shell of the trap will resemble in appearance the animal to be caught; and providing the interior of said shell with a spring and trigger, together with other contrivances, that will operate to catch any animal that may attempt to take the bait.

To enable others to make and use my trap, I will proceed to describe its construction by reference to the accompanying drawings.

I make my trap of any suitable material, and form the outside or shell A, as near as may be, of the shape and size of the animal to be caught.

Longitudinally through the rear end of this shell passes an iron rod, B, which, when partially drawn out, represents a tail.

Near the inner end of this rod, and attached thereto, are a couple of long needle-like darts, C, which pass through the eyes of the shell.

The end of this rod B, between the darts C is bent downward, forming a pawl, D, which catches in a suitable notch, S, cut in a long lever, E, said lever being pivoted to the shell A, immediately beneath that part through which the rod B slides, and extends forward through a slot in the throat of the shell, some distance beyond its nose, and it is upon this part that the bait is to be placed.

Around the rod B, between the point of its connection with the darts C and the rear end of the shell A, is placed a strong spiral spring, F, the forward end of which presses against the shoulders of the darts, while the other end operates against a vertical bearing, $h$, on the lever, just inside of its pivotal point; and as this bearing is forked, so as to extend above and on each side of the rod, the pressure of the spring in that direction will lift the lever E.

Figure 1:
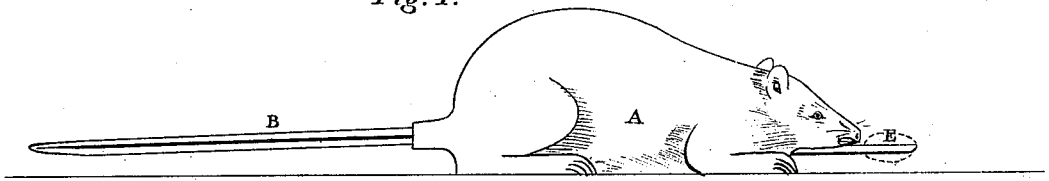
Figure 1 represents a perspective view of my improved trap
Figure 2:
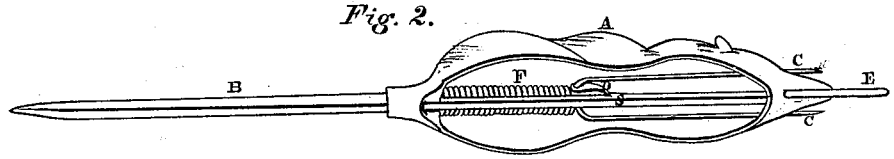
Figure 2 represents the trap thrown on its side, whereby a bottom interior view exhibits all its parts.
Figure 3:
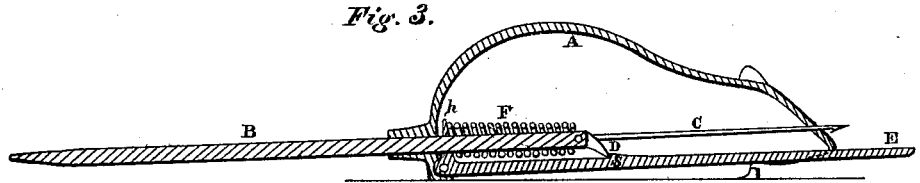
Figure 3 represents a longitudinal vertical section of the trap, showing the relative position of parts when "set."

The withdrawal of the tail or rod B, so that the pawl D will catch in the notch S, and set the trap, places the parts in the position represented by fig. 3. When in this condition, a slight downward pressure of the point of the lever will disengage the pawl D from the notch S, and the darts C will be thrown forward through the eyes of the shell A with a force sufficient to penetrate any animal that may attempt to take the bait, or at least with a force corresponding to the strength of the spring.

Having thus briefly described my invention,

I claim a trap for catching animals, so constructed as that the outside or shell of the trap will resemble in appearance the animal it is designed to catch, and providing the interior of said shell with a spring and trigger, or other setting and releasing-mechanism that will operate to catch the animal that may attempt to take the bait.

JOSIAH W. ELLS.

Witnesses:
J. B. WHALEY,
B. G. MORRISON.